July 4, 1967 W. KURZ 3,329,775
CONNECTION LAYOUT FOR SECONDARY TELEPHONE
INSTALLATION HAVING CONVERTER MEANS
Filed July 1, 1964
5 Sheets-Sheet 1

July 4, 1967 W. KURZ 3,329,775

CONNECTION LAYOUT FOR SECONDARY TELEPHONE INSTALLATION HAVING CONVERTER MEANS

Filed July 1, 1964 5 Sheets-Sheet 2

July 4, 1967 W. KURZ 3,329,775

CONNECTION LAYOUT FOR SECONDARY TELEPHONE INSTALLATION HAVING CONVERTER MEANS

Filed July 1, 1964

5 Sheets-Sheet 4

July 4, 1967 W. KURZ 3,329,775

CONNECTION LAYOUT FOR SECONDARY TELEPHONE INSTALLATION HAVING CONVERTER MEANS

Filed July 1, 1964 5 Sheets-Sheet 5

United States Patent Office 3,329,775
Patented July 4, 1967

3,329,775

CONNECTION LAYOUT FOR SECONDARY TELEPHONE INSTALLATION HAVING CONVERTER MEANS

Wilhelm Kurz, Munich, Germany, assignor to Siemens & Halske Aktiengesellschaft, Munich, Germany
Filed July 1, 1964, Ser. No. 379,606
Claims priority, application Germany, July 5, 1963, S 86,021, S 86,023
16 Claims. (Cl. 179—18)

This invention concerns a connection layout or system for a telephone installation, and in particular a secondary telephone installation, for cooperation with code and pulse dialing systems, wherein there are assigned to a first group of speaking stations keys for code dialing, and to a second group of speaking stations dial switches or number dials for the emission of decimal pulses.

There is already known one connection layout for a secondary telephone installation cooperable with speaking stations having keys for code dialing, as well as with speaking stations having number switches for impulse dialing, this system employing different transmission devices for the different types of speaking stations. In this system the speaking stations with keys for code dialing can make connections only through special transmission devices to which a converter can be connected, such converter being designed to decode the coded connection signal. Such converter must be assigned to the transmission device from the start of the call to the completion of the dialing operation. Furthermore, such a converter must not only convert the coded dial signals into decimal pulses, but it must also temporarily store the transmitted dial signals, since the coded dial signals arrive very much faster at the converter than the decimal pulses can be transmitted. Such a converter must therefore have assigned to it as many storage units for the storage of dial signals as the maximum number of signals which can be sent in short successive order from a speaking station having keys for code dialing. Such number can be as high as 16 for secondary telephone installations provided with through dialing for long distance connections. That is, the number of digital units which can be transmitted from one station in order to complete the connection arrangement may be as high as 16, and the storage units must be of comparable number in the known arrangement.

Since the converters referred to in this known system are connected to a single transmission device during the entire dialing time following seizure of that transmission device by a speaking station, several such converters must be provided for each secondary installation. The number of converters obviously will depend upon the amount of traffic at that secondary installation.

It will be evident from the above that the known method requires a number of code converters, each code converter having a storage area with at least as many storage units as the maximum number of dial signals which any code dialing party can employ to make a connection. The requirements of such an installation naturally grow with the increase in the number of code dialing parties, as compared with the number of parties who can dial only with decimal pulses.

Connection layouts are also known which employ central storage areas for information which is provided with a special characteristic, this special characteristic making it possible to remove the stored information in accordance with any desired procedure, as for example in time order. Information like this, for example telephone numbers, may be taken out of storage in a special order of succession required by this additional information and such information may, for example, cause a connection to be made to the speaking station which directed the telephone number to the storage area.

An object of the present invention is to utilize, in a simple manner, this known technique of storage and removal from storage, in the telephone art, and in particular to employ such a system in a telephone installation cooperable with both code dialing and impulse dialing speaking stations, in such fashion as to save storage capacity by temporary storage of code dial signals.

In the system of the invention a receiver, after reception of each dial signal, is connected to a central apparatus which contains temporary storage means. This central apparatus identifies the dial signal and the dial converter which was temporarily assigned to the connection line, and also identifies the unit number of the dial signal which has just been received. All three of these items of information are first temporarily stored in this central apparatus and then transferred to a central storage area which is intended to receive like sets of signals from a number of different dial signal converters. That is, the apparatus of the invention employs a central storage apparatus wherein three items of information are stored for each digit of a code dial signal received at each of a number of different dial converters. These three items are the identification of the digit itself, the identification of the unit number of that digit, and the identification of the dial converter from which the digit was received. Then, completely independently of the storage operation, the stored dial signal can be transmitted from the central storage area to the dial converter and from this converter to the connection line, by switching on the identification of the unit number of the dial signal to be sent, at the exit of the storage area.

In this fashion the required storage capacity in telephone installations operable with both code dialing and decimal pulse dialing stations is considerably reduced. The reduction of the storage capacity is simply explained by following reflections which are dependent upon the traffic conditions of the secondary installation.

In the layout of the invention a single central storage area is employed for a single telephone installation. In this central storage area two special identification signals are stored with each dial signal. One of these signals identifies the transmission device from which the signal was sent to the storage area and another signal identifies the unit number of the dial signal which is stored. Since these two identification signals are assigned to each dial signal stored in the storage area, no matter which speaking station emitted that dial signal, any dial signal can be temporarily stored in the central area and retrieved in accordance with identification of the appropriate transmission device and of the appropriate unit number. Therefore, the retrieval of the stored dial signal may be made completely independent of the storage opeartion itself. That is, the stored dial signals can be retrieved from storage upon demand in accordance with the assigned identification of the dial converter and the identification of the unit number and forwarded by the dial converter as decimal dialing pulses.

The dial signals are thus successively fed into the storage unit from different speaking stations. As a result of this central storage arrangement and the independence of retrieval, not only is the dependence on the dialing speed of any party eliminated, but also the storage units are only assigned to dial signals which have already been dialed. As a result, no specified maximum number of storage units per connection device is required, so that storage units are saved. Storage units are in fact assigned only in accordance with the traffic conditions.

This quick storage and quick retrieval from storage, in independent fashion, and the storage in storage units for each separate dial signal, makes it possible for the secondary installation to employ considerably fewer storage units than the total required in the previously-described known method for temporary storage of dial signals.

To reiterate, the retrieval from storage in the fashion described is possible by reason of the fact that the dial converter can require such retrieval only when it is ready to utilize the stored information and can thereafter immediately convert and transmit the information as decimal pulses.

In the drawings, an operative embodiment of the invention is shown, together with important details essential to an understanding of the operation thereof.

Figure 4:
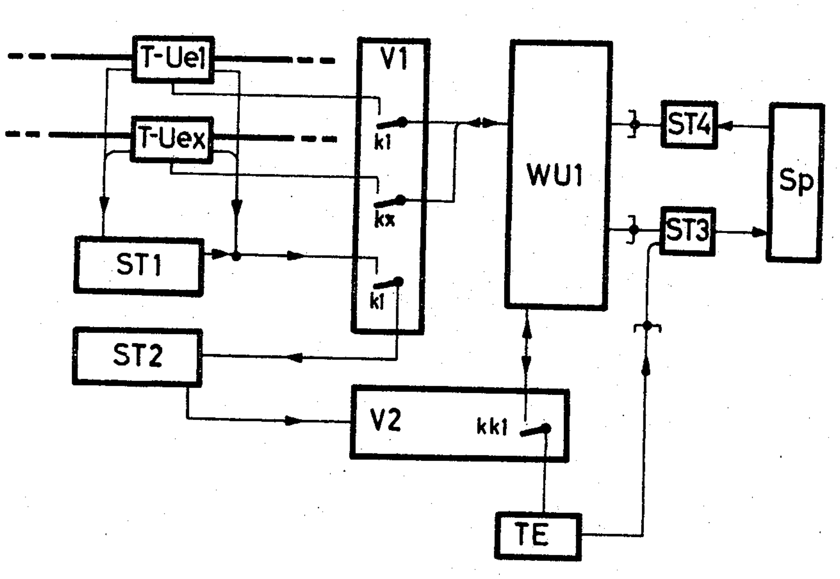
FIG. 4 is a diagrammatic arrangement of the telephone installation of the invention, provided with facilities for reception of both code dialing and pulse dialing signals. As will be explained, the system is designed either to store coded dial signals or to immediately transmit received decimal dial signals.
Figure 5A:
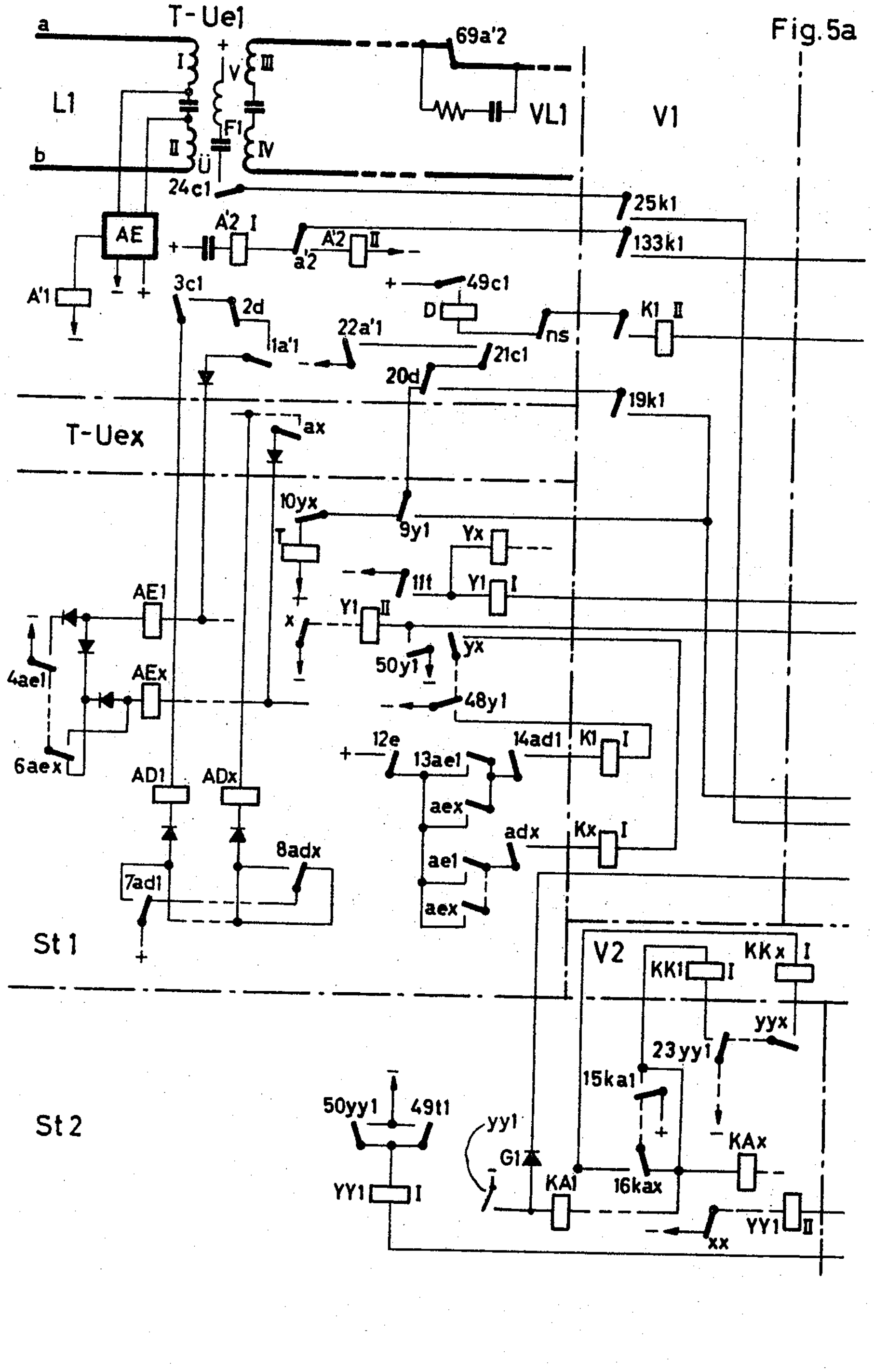
Figure 5B:
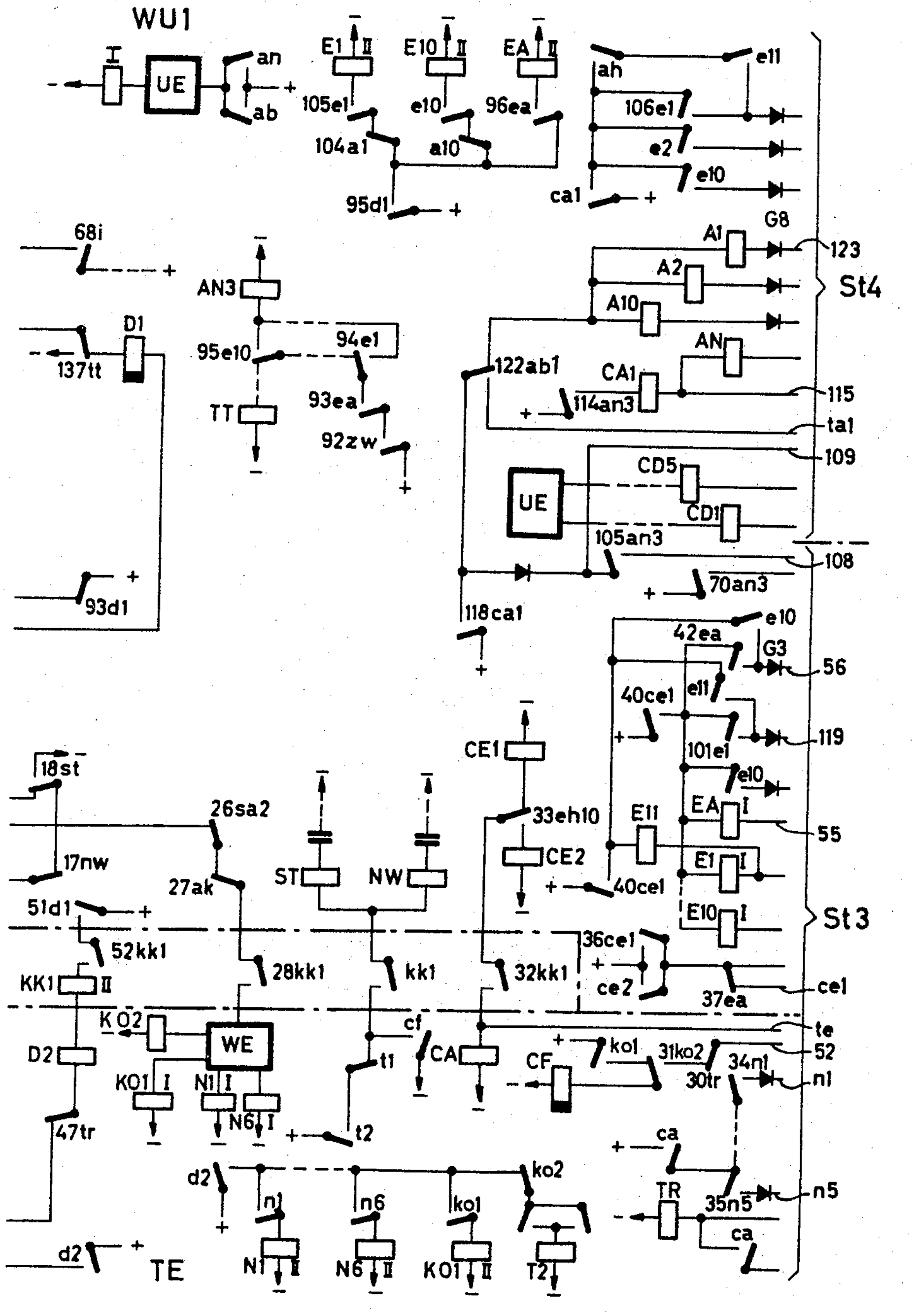
Figure 6A:
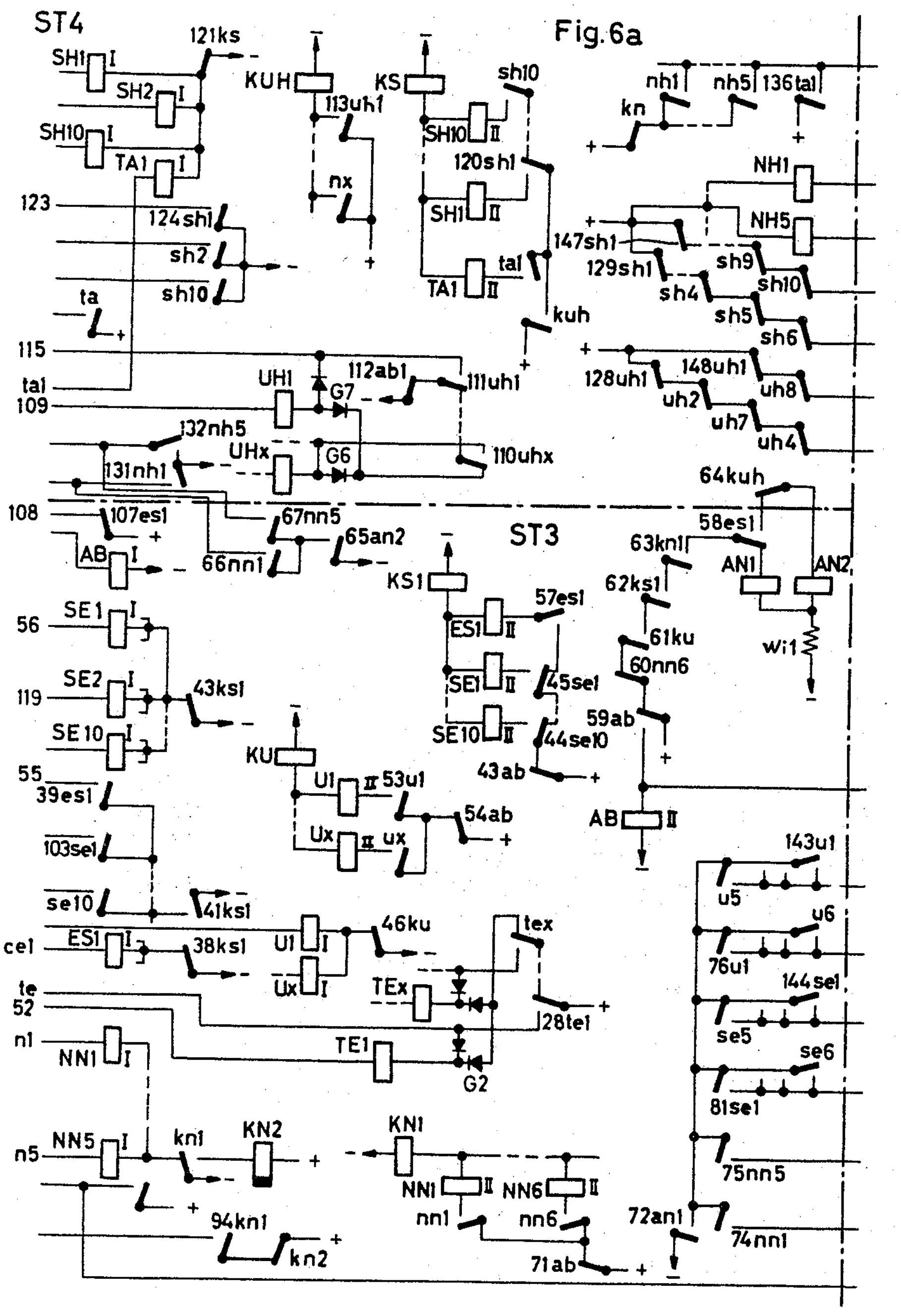
Figure 6B:
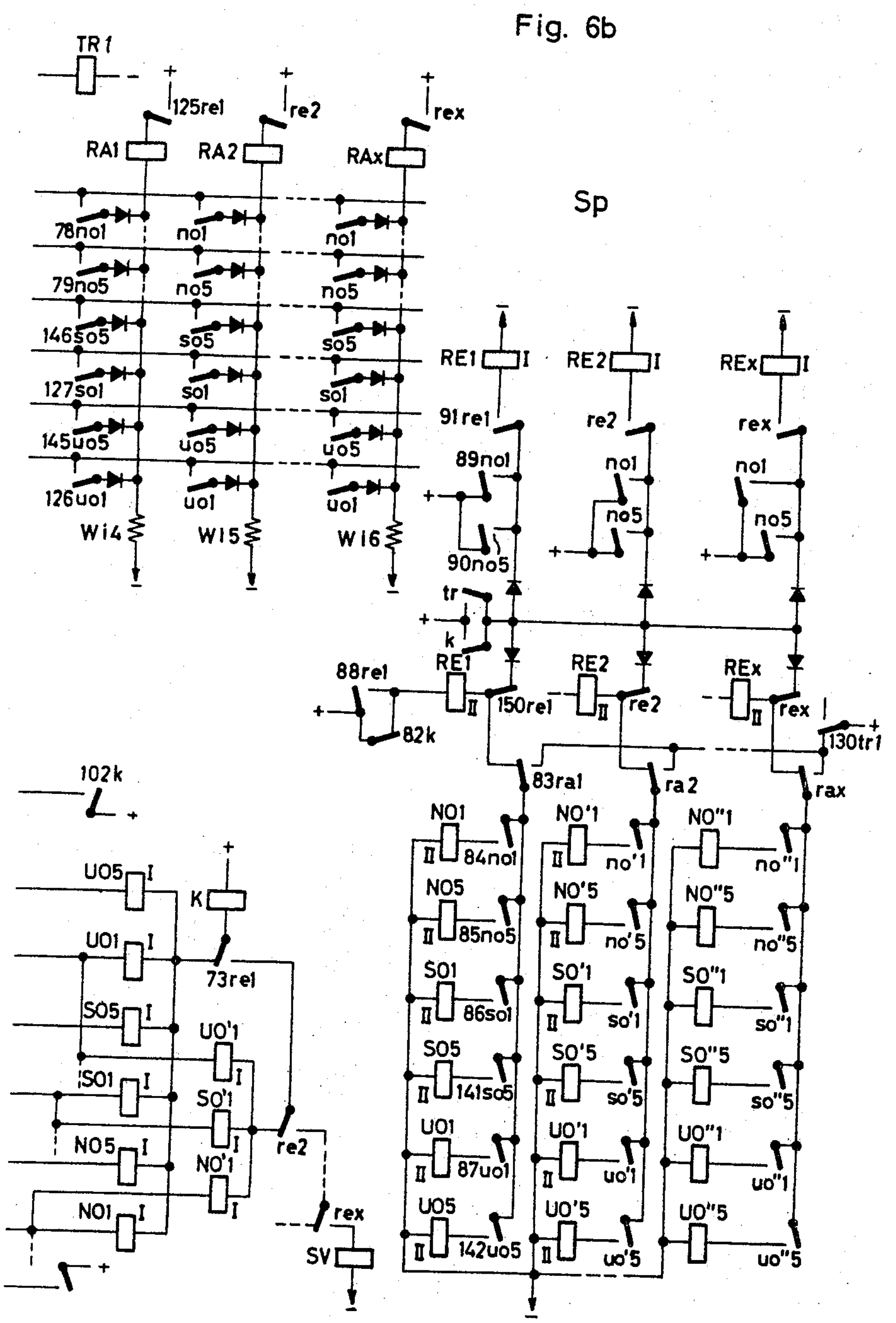

FIGS. 5 and 6, together, show details of the complete system of FIG. 4, FIG. 5*a* showing the transmission devices, the connector $V_1$ and the control apparatus S*t*1 and S*t*2, FIG. 5*b* showing the dial converter WU1 and the dial receiver TE, FIG. 6*a* showing the control apparatus S*t*3 and S*t*4, and FIG. 6*b* showing the central storage apparatus S*p*. FIGS. 5*a* and 5*b* additionally show the connector apparatus V2.

Figure 1:
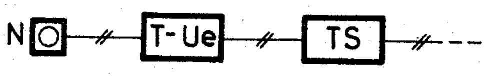
FIGS. 1–3 are diagrammatic illustrations of portions of telephone systems identifying various positions in which the key dial transmission devices can be placed.

In FIG. 1 the key dial transmission device or repeater T–U*e* is connected in the subscriber's line between the subscriber's station N and the line circuit TS, so that a key dial transmission device is assigned to each party. This key dial transmission device has access to the central office as indicated by the dashed line to the right of FIG. 1.

Figure 2:
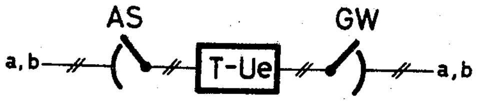

In FIG. 2 the key dial transmission device is arranged between the line finder AS and the group selector GW and in this example, as compared to the example of FIG. 1, relatively fewer key dial transmission devices are required, as the key dial transmission devices are grouped together by the line finder. The key dial transmission devices of the various line finder-group selector combinations have access to the central office as indicated in the same manner employed for FIG. 1.

Figure 3:
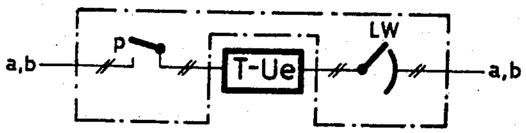

FIG. 3 shows how a key dial transmission device may be assigned to a final connector LW. This is important, for example, if back inquiry connections can be made to the inquiring speaking stations of a secondary installation, via the back inquiry route and the connection dialing means. The key dial transmission devices can not only be made as shown by the examples of FIGS. 1 and 3, but can also be coordinated or assigned to any of the various other stepping devices of the telephone connection system, in a manner that will be evident.

With the help of FIG. 4, wherein the principle of the layout of this invention is shown, the following is a description of the course of the switching processes.

In responding to a key dial transmission from a speaking station with keys for code dialing, upon receipt of the first dial signal in the key dial transmission device (for example T–U*e*1 of FIG. 4), an impulse is given to control apparatus S*t*1 and S*t*2. In control apparatus S*t*1 the key dial transmission device from which the impulse originated is identified. In control apparatus S*t*1 there is also identified which converter is free at the time, so that the connection between the identified key dial transmission device and a free dial converter WU1 can be made, for example by way of the coupling points of coupling relay K1 of connector $V_1$.

Simultaneously with this switching operation, the connection between the free dial converter WU1 and the free dial receiver TE is made by way of control apparatus S*t*2 wherein the free dial converter WU1 and the free dial receiver TE are identified, for example, by way of coupling points *kk*1 of connector V2. In receiver TE the coded dial signal (for example, as different frequencies or tones) is picked up and control apparatus S*t*3 is activated. That is, the dial signal received in receiver TE is temporarily stored in control apparatus S*t*3. Further, in control apparatus S*t*3 the identification of the converter and the identification of the unit number of the temporarily-stored dial signal are recorded. The unit number of the dial signals in each case refers to one period within which the dial converter is seized or used.

Thus, in control apparatus S*t*3, three identifications are temporarily stored, that is, the dial signal, the identification of the converter, and the identification of the unit number of the dial signal.

Further, it must be ascertained whether the dial signal received is the first-dialed signal, or is a succeeding dial signal (second, third, etc.). The first dial signal can be forwarded immediately, without temporary storage, after conversion into decimal dial pulses. Only the following coded dial signals must be temporarily stored. The second coded dial signal received during the period in which the dial converter is occupied, can be transmitted as decimal dial pulses only after the first dialed signal is transmitted.

During the period of connection of the control apparatus to the key dial transmission device, in each case only one dial signal is received. That is, the control apparatus is newly demanded in connection with transmission of each dial signal (so called "flying switching"). Only converter WU1 remains assigned to the key dial transmission device, through a coupling point of connector V1, until the successively received dial signals are forwarded again, and a specified short time period (for example 300 milliseconds) has expired without reception of a new signal. If the party continues to dial after a short interval, as already described, again a dial converter is assigned to the key dial transmission device T–U*e*1. The dial signal then received is again considered the first with reference to the assignment of the converter.

Upon receipt of the three identifications referred to above, by control means S*t*3, receiver TE and the corresponding coupling points of connector V1 can be switched open.

If the dial signal in question received via a specified key dial transmission is the first, the identification of the unit number and the dial signal can be transmitted to dial converter WU1, and the coded dial signal is converted in the converter into decimal pulses and forwarded in the connection line. After transmission of a dial signal to converter WU1, control apparatus S*t*3 can be switched open. After complete emission of a series of decimal pulses, the converter is switched open if no further dial signal arrives, for example, until expiration of a specific interim dial period for decimal pulses.

If the signal received in receiver TE is a second, or a further dial signal then, upon proper receipt of the three identifications mentioned (the dial signal, the identification of the converter, and the identification of the unit number of the dial signal) in control apparatus S*t*3, the identifications are transmitted to central store S*p*. Upon receipt of these identifications in store S*p*, control apparatus S*t*3 is switched open.

Only upon the completion of transmission of the previous unit number via the converter WU and upon the passage of the succeeding interim dial period is control apparatus S*t*4 activated. Then, by reason of the identification of the converter and the identification of the correct unit number given by the converter, the dial signal is demanded from its store, by the storage device, and is transmitted to converter WU1. Control apparatus S*t*4 is then switched open. In converter WU1 the conversion of the coded dial signal into a decimal pulse series, and the transmission of the pulse series through the connection line then take place.

Referring now to FIGS. 5 and 6, a symbolically shown feeding point arrangement AE is connected to the key dial transmission device T–U*e*1. In the seizure of the key dial transmission device, the relay C1 (not shown) is switched on in the usual conventional manner. If the subscriber's station which sizes the key dial transmission device T–Ue1 sends a coded dial signal by using a key, a pre-dial signal (for example in the form of a loop interruption) is also given. The relay A'1 is then switched on, by feeding point arrangement AE, in a manner not further shown. An impulse is then sent to the control apparatus St1 through contacts 1a'1, 2d and 3c1 (upper left, FIG. 5a).

(It is assumed that in control apparatus St1, contacts 4ae1 to 6aex and 7ad1 to 8adx, middle left, FIG. 5a, are in a position indicating de-energization of the corresponding relays AE1 to AEx.) Thus, utilizing contacts 1a'1 and 3c1, relays AE1 and AD1 are switched on and the key dial transmission device associated with relays A'1 and C1 is identified. [It will be evident that the contacts of each relay are identified by the relay's identification, with a distinguishing prefix, as the contacts of A'1 may be 1a'1, while the contacts of relay C1 may be 3c1, etc.]

As the control apparatus St1 is not in use and not connected with a converter, contacts 9y1 to 10 yx are also in a released position, so that relay T (middle left, FIG. 5a) and E (not shown) are switched on. (All relay contacts are shown in their released position corresponding to the de-energized condition of the relay.) By way of contacts 11t in control apparatus St1 and contacts 93d1 in dial converter WU1 (middle left, FIG. 5b), the relay Y1 is then switched on.

In order to connect key dial transmission device T–Ue1 to the converter WU1, the following energizing circuit for coupling relay K1 (middle right, FIG. 5a) is formed:

(1) K1(V1)+, 12e, 13ae1, 14ae1, K1 (I), 48y1, —

Upon the energization of coupling relay K1, a holding circuit for that relay is established, that circuit including the now-closed contacts 49c1 in the transmission device T–Ue1, as well as the contacts 50y1 in the control apparatus St1. In this circuit relays D and D1 are also switched on.

Operation of the coupling relay K1 connects the key dial transmission device T–Ue1 with the converter WU1. Then, a coupling relay of connector V2 forms a connection between the seized converter WU1 and a free receiver TE. This coupling relay is switched on by means of control aparatus St2, as will now be explained.

Converter WU1 is identified in the control apparatus St2 by relay KA1, so long as no other converter has been identified therein by switching on another identification relay, for example, KAx. Relay KA1 is switched on in the following circuit:

(2) KA1(St2)+, 15a1, . . ., 16kax . . . KA1, G1, 17nw, . . . 18st, 19k1, 20d, 21c1, 22a'1, —

If receiver TE is free, relay YY1 of control apparatus St2 is switched on by way of its coil I through a contact 49t1 of relay T1. Relay T1 is similar in function to relay T, but is not shown. A temporary holding circuit for relay YY1 is immediately set up by closure of its contacts 50yy1.

An operating circuit for coupling relay KK1 is now set up as follows:

(3) KK1(V2)+, 14ka1, KK1 (I), 23yy1 . . ., —

A holding circuit for the coupling relay KK1 is formed over its coil II through the now-closed contacts 51d1 and 52kk1. This circuit also includes the holding coil II of relay YY1, so that a secondary holding circuit is set up for that relay, in dependence upon continued operation of the coupling relay KK1. The relay D2 is also operated in this holding circuit to open the primary energizing circuit of relay YY1.

A holding circuit for relay KA1 is also set up upon operation of relay YY1, this circuit being only symbolically shown.

The receiver TE is therefore connected by the coupling relay contacts 28kk1 to the dial transmission device T–Ue1, by way of the converter WU1 and the contacts of coupling relay K1 of connector V1. The dial signals are inductively coupled to the repeater coil V(Ü) and thereby transmitted over the following path to dial signal receiver WE of receiver TE:

(4) WE(TE)+V(Ü), F1, 24c1, 25k1, 26sa2, 27ak, 28kk1, WE

These dial signals may be for example, in two out of five frequency code, though other codes may be employed. The signals are converted into direct current code signals in the receiver WE and transmitted in coded fashion to relays N1 to N6.

The relays KO1 and KO2 are control relays associated also with the receiver WE. If the dial signal receiver receives no coded dial signals, relay KO1 operates to energize relay CF (lower right, FIG. 5b). Relay CF causes the control apparatus St1 and St2 to be switched open, and also causes the connection between the receiver WE and the converter WU1 to be broken. Upon receipt of decimal dial impulses in dial receiver WU1 an impulse correction takes place in a manner not shown. Upon completion of dialing, after a specified interim dial period has expired, converter WU1 is switched open.

Let it be assumed, however, that coded dial signals are being received. If, after connection of receiver TE with converter WU1, control apparatus St3 is free, relay TE1 of control apparatus St3, in FIG. 6a (lower left), and relay CA of receiver TE (FIG. 5b), as well as relay CE1 of converter WU1 (middle right, FIG. 5b) are switched on:

(5) TE1(St3)+, 28te1, . . . tex, G2, TE1, bus 52, 30tr, 31ko2, CF —

In this circuit relay CF receives insufficient current to operate.

(6) CA(TE)+, 28te1, bus te, CA, —

(7) CE1(WU1)+, 28te1, bus te, 32kk1, 33eh10, CE1, —

It will be evident that the dial signal register relays N have not been shown completely. That is, only the relays N1 and N6 are identified. In similar fashion, corresponding relays in various other parts of the apparatus will be so shown.

The operation of relay CA of receiver TE causes the dial signal stored in the relays N1 to N6 to be switched to the control apparatus St3, via two corresponding busses n1 to n6. In control apparatus St3 the signal relays corresponding to the dial signals, for example NN1 and NN5, are switched on.

An energizing circuit for relay ES1 in control apparatus St3 (lower left, FIG. 6a) is completed by operation of two of the signal relays NN1 to NN6 and of the relay TE1. Operation of the relay ES1 indicates that the received dial signal is the first unit or the first digit of the dial signal to be sent.

(8) ES1(St3)+, 36ce1, 37ea, bus ce1,, ES1 (I) 38ks1, —

A holding circuit is formed for relay ES1 over coil II through contact 57es1. In this holding circuit relay KS1 is also switched on, and operation of this relay prevents the formation of energizing circuits for relays SE1 to SE10 (by opening of contact 43ks1). Relay EA of converter WU1 is then switched on over contacts 41ks1, 39es1, and bus 55, as well as contacts 40ce1. A holding circuit for relay EA is then established over contacts 95d1, 96ea, and the holding coil II (top, FIG. 5b).

The relay U1 (lower portion, FIG. 6a) is then switched on by way of the contacts 46ku and the closure of contacts 36ce1. This relay U1 identifies the converter WU1 as connected with the control apparatus St3. A holding circuit is formed for relay U1 over contacts 53u1 and 54ab, including holding coil II. Relay KU is also switched on in this holding circuit, and its contacts 46$ku$ foreclose additional converters being identified in control apparatus S$t$3.

Holding circuits for the dial signal storage relays NN1 and NN5 are established by use of the holding coils II of the corresponding relays (bottom, FIG. 6$a$). These holding circuits include relay KN1 and the resulting closure of contacts 94$kn$1 causes operation of isolating relay TR of receiver TE (lower right, FIG. 5$b$). As a result of operation of the isolating relay, the contacts 47$tr$ in the holding circuit for the coupling relay KK1 (FIG. 5$b$) are interrupted. Receiver TE, as well as accompanying relay KK1 and the control apparatus S$t$2, are released.

As indicated above, the operation of relay ES1 in control apparatus S$t$3 indicates that the dial signal stored in the storage relays NN1 and NN6 is the first received dial signal during the particular operation period of the dial converter WU1. By the closure of contacts 58$es$1 (middle right, FIG. 6$a$), an operating circuit for relay AN2 is formed:

(9) AN2(S$t$3)+, 59$ab$, 60$nn$6, 61$ku$, 62$ks$1, 63$kn$1, 58$es$1, 64$kuh$, AN2, W$i$1,—

Relays CD1 and CD5 of the dial converter WU1 (middle right, FIG. 5$b$), are switched on by the closure of contacts 65$an$2 and the closed contacts of the relays identifying the dial signal. Thereby, the converter UE is controlled in a manner not fully explained. This converter changes the dial code (which may be, e.g., a two out of five, different tone signal) into decimal dial pulses. The converter UE is also shown at the top left of FIG. 5$b$ where its connections to the relay I are shown. That relay is then pulsed a number of times corresponding to the decimal equivalent of the first unit of the coded signal. Contacts 68$i$ transmit the dial pulses to relay A'2 of the key dial transmission device T–U$e$1. Through contacts 69$a'$2 the dial pulses are transmitted over the connecting line VL1.

In converter WU1, relay AN3 is switched on by the operation of the two relays CD1 and CD5 in a conventional manner which, for simplicity's sake, is not shown. Ground potential (+) is then supplied to control apparatus S$t$3 by way of contact 70$an$3 (middle right, FIG. 5$b$). More specifically, ground potential is supplied to coil I of relay AB, thus operating this relay. Operation of relay AB commences the switching open of the control apparatus S$t$3. The contacts 59$ab$ interrupt the circuit for relay AN2 and the contacts 54$ab$ interrupt the circuit for relays U1 and KU. Further, through the contacts 71$ab$ the circuits for the two signal storage relays NN1 and NN5, as well as for the relay KN1, are interrupted. Finally, through contacts 43$ab$, the operating circuits for relays ES1 and KS1 are interrupted.

The operation of the system as so far described is for the first-received dial signal. That is, this operation takes place as the first-received digit of the dial signal is received. That digit is of course immediately transmitted by the transmission device. If a second dial signal does not arrive before the completion of the transmission of the first signal, by the transmission device T–U$e$1, plus a short additional time period, the dial converter WU1 is released in a manner which is not shown. Then, the next dial signal sent by the party will just cause repetition of the previous operation and will be treated by the secondary telephone installation as if it were the first digit of the dial signal. That is, the second-transmitted digit will be immediately decoded and changed to a decimal pulse signal which is sent over the connecting lines without storage in the central storage area S$p$.

The release of the converter can be effected by operation of a relay ZW (not shown) which controls contacts 92$zw$ (middle, FIG. 5$b$) of the converter WU1. Closure of these contacts causes energization of control relay TT, which opens the holding circuit for the relays D1 and Y1.

In the usual condition the second digit of the dial signal will be received before completion of the transmitting operation for the first digit. This is because coded dial signals can be ent much faster than they can be converted into decimal pulses and transmitted. If the second dial signal arrives in the key dial transmission device T–U$e$1 prior to expiration of the period provided for, the demand for the dial converter WU1 stays intact and the dial converter is not released. In this case the control apparatus S$t$2 of FIG. 5$a$ is pulsed in a manner already described above and, as previously described, a connection between the dial converter WU1 and the receiver TE is made by way of connector V2.

In the same manner as previously described for the first digit, the dial receiver WE of the receiver TE picks up the coded dial signal. The relay TE1 again seizes the control apparatus S$t$3 in the same manner previously described, and two relays of the relays NN1 and NN6 of the control apparatus S$t$3 temporarily store the coded dial signal. Also, in the holding circuit of the storage relays, relays KN1 is switched on. By closure of the contacts 94$kn$1 to operate the isolating relay TR, the receiver TE and the coupling relay KK1 are again switched open.

When the dial signal is received by receiver TE from the dial converter WU1, relay U1 of FIG. 6$a$ is switched on over contacts 36$ce$1 of now-energized relay CE1. However, no circuit is formed for energization of relay ES1 of FIG. 6$a$, since the contacts 37$ea$ are open by reason of continued operation of relay EA from the receipt of the first digit.

Consequently, it is not possible for the apparatus to indicate reception of the first digit at this time. Rather, by closure of contacts 40$ce$1 an energizing circuit is formed for relay SE1 by way of the now-closed contacts 42$ea$:

(10) SE1(S$t$3)+, 40$ce$1, 42$ea$, G3, bus 56, SE1 (I), 43$ks$1, —

A holding circuit for relay SE1 is formed by contacts 45$se$1 and holding coil II of the relay. This holding circuit also includes relay KS1 which is operated at this time. Also, the holding circuit of relay U1 includes a relay KU which is switched on. By closure of contacts 103$se$1, relay E1 (lower right, FIG. 5$b$) is switched on by way of contacts 41$ks$1.

A holding circuit for relay E1 is formed including the holding coil II (top, FIG. 5$b$) and contacts 95$d$1, 104$a$1, and 105$e$1. Contacts 101$e$1 prepare the circuit for the identification of the next unit number for the next received digit, through relay SE2. The operating circuit 9 above identified cannot be completed at this time to energize relay AN2 (middle right, FIG. 6$a$), because the contacts 58$es$1 are in a de-energized or open condition. However, relay AN1 is switched on in the following circuit:

(11) AN1(S$t$3)+, 59$ab$, 60$nn$6, 61$ku$, 62$ks$1, 63$kn$1 58$es$1, AN1, W$i$1, —

The closure of contacts 72$an$1, (bottom right, FIG. 6$a$) permits the identification stored in the control apparatus S$t$3 to be transferred to the central storage area S$p$. These identifications of course are of the dial converter WU1, the unit number (which in this case is 2) and of the information contained in the digit itself. In the storage area S$p$ the following circuits are completed:

(a) for storage of the dial signal, for example relays NO1 and NO5:

(12) NO1(S$p$)+, K, 73$re$1, NO1 (I), 74$nn$1, 72$an$1, —

(13) NO5(S$p$)+, K, 73$re$1, NO5 (I), 75$nn$5, 72$an$1, —

(b) for identification of the dial converter WU1, the relays UO1 and UO5:

(14)

$$\frac{\text{UO1}}{\text{UO5}}\ (\text{S}p)+,\ \text{K},\ \mathbf{73}re\mathbf{1},\ \frac{\text{UO1 (I)},\ \mathbf{76}u\mathbf{1}}{\text{UO5 (I)},\ \mathbf{143}u\mathbf{1}},\ \mathbf{72}an\mathbf{1},\ -$$

(c) for identification of the unit number of the digit, the relays SO1 and SO5:

(15)

$$\frac{\mathrm{SO1}}{\mathrm{SO5}}\ (\mathrm{S}p)+,\ \mathrm{K},\ \mathbf{73}re\mathbf{1},\ \frac{\mathrm{SO1\ (I)},\ \mathbf{81}se\mathbf{1}}{\mathrm{SO5\ (I)},\ \mathbf{144}se\mathbf{1}},\ \mathbf{72}an\mathbf{1},\ -$$

The dial converter WU1, as well as the unit number of the stored digit are stored in a two out of five code, so that two of the relays UO1 . . . UO5 are energized, as well as two of the relays SO1 . . . SO5, even through only one of the respective converter identification relays U1 . . .Ux, and one of the respective digit unit identification relays SE1 . . . SE10 are operated. The use of the two out of five relay code saves storage relays. Of course the contact sets 143*u*1 . . . *u*5 and 76*u*1 . . . *u*6 indicate this function schematically. The dial signal is already in a two out of five code, so no such combination is needed for relays NO1 . . . NO5.

Relay K in each of the above energizing circuits is only operated if all of the four circuits 12 to 15 are completed. Through contacts 102*k*, relay AB therefore is switched on. This relay initiates the switching open of control apparatus S*t*3. However, the storage relays NO1, NO5, UO1, UO5, SO1 and SO5, have holding circuits which are operative at this time to hold the storage relays. These holding circuits also include the relay RE1 which is identified with the first storage unit of the *x* storage units of the storage area S*p*. The holding circuits for the various storage relays are as follows:

(16) NO1(II)(S*p*)+, 82*k*, RE1(II), 83*ra*1, 84*no*1, NO1(II), —

(17) NO5(II)(S*p*)+, 82*k*, RE1(II), 83*ra*1, 85*no*5, NO5(II), —

(18)

$$\frac{\mathrm{SO1\ (II)\ (S}p)}{\mathrm{SO5\ (II)\ (S}p)}+,\ \mathbf{82}k,\ \mathrm{RE1\ (II)},\ \mathbf{83}ra\mathbf{1},\ \frac{\mathbf{86}so\mathbf{1},\ \mathrm{SO1\ (II)}}{\mathbf{141}so,\ \mathrm{SO5\ (II)}},\ -$$

(19)

$$\frac{\mathrm{UO1\ (II)}}{\mathrm{UO5\ (II)}}\ (\mathrm{S}p)+,\ \mathbf{82}k,\ \mathrm{RE1\ (II)},\ \mathbf{83}ra\mathbf{1},\ \frac{\mathbf{87}uo\mathbf{1},\ \mathrm{UO1\ (II)}}{\mathbf{142}uo\mathbf{5},\ \mathrm{UO5\ (II)}},\ -$$

After closure of contacts 88*re*1, the holding circuits for the storage relays NO1, NO5, SO1, SO5, UO1 and UO5 extend over these contacts. A holding circuit for relay RE1 includes contacts 89*no*1 and 90*no*5 of the dial signal, relay, as well as contacts 91*re*1. Different dial signals with accompanying different identifications of converters and of unit numbers can be stored in the storage area, the number of such signals being dependent on the number of storage units provided. In the present operative embodiment it is assumed that all storage units are free and the identifications to be stored are picked up in the first storage unit.

Through operation of contacts 73*re*1 (lower left, FIG. 6*b*), the next storage unit for storage of a further dial signal from any speaking station, by way even of a different converter, with any unit number, is prepared. (See relays UO'1, SO'1, NO'1, etc.)

This storage unit may therefore be employed by the third unit of the digits transmitted by the code calling station, if that digit is the next one to reach the store S*p*. If it is, the apparatus will function as above described, with unit 2, though a different combination of the SO relays will be energized, since the SE2 relay of control apparatus S*t*3 will then be operated. However, if a digit is received at store S*p* from another code dialing station prior to the third digit from the station which seized transmission device T–U*e*1, that digit will be recorded in the second storage unit, together with identification of the converter WU associated therewith, as well as the unit number of the recorded digit. The third unit from transmission device T–U*e*1 will then be recorded in whichever storage unit is then next in line.

The retrieval from storage of the recorded digits is completely independent, timewise, from the recording and depends on the speed of transmission of decimal pulses from the transmission device T–U*e*1. Such retrieval and transmission will now be described in detail.

After the dial converter WU1 has completed the transmission of a series of impulses corresponding to the first digit, and a preselected time period has expired, the relay ZW (not shown) is switched to close its contacts 92*zw* and therefore to form an energizing circuit for relay AN3 (upper left, FIG. 5*b*):

(20) AN3(WU1)+, 92*zw*, 93*ea*, 94*e*1, . . . , AN3, —

However, the operation of relay E1 prevents operation of relay TT at this time.

By the closure of contacts 105*an*3 an energizing circuit for relay UH1 (upper left, FIG. 6*a*) of control means S*t*4 is formed, since the relay ES1 of control apparatus S*t*3 is at this time de-energized and its contacts 107*es*1 are then closed. The circuit is as follows:

(21) UH1(S*t*4)+, 107*es*1, bus 108, 105*an*3, bus 109, UH1, G7, 110*uhx*, . . . 111*uh*1, 112*ab*1, —

The relay UH1 in control apparatus S*t*4 identifies the pulse which caused its operation as having come from dial converter WU1. Relay UH1 can be switched on only if all contacts of corresponding UH relays are in their rest positions, thereby identifying control apparatus S*t*4 as being free. A holding circuit is then formed for the relay UH1 by way of the now-closed set of contacts 111*uh*1 and rectifier G7. Relay KUH is then switched on by way of contacts 113*uh*1. Further, relay CA1 of dial converter WU1 is switched on in the following circuit:

(22) CA1(WU1)+, 114*an*3, CA1, bus 115, 111*uh*1, 112*ab*1, —

The energization of relay CA1 in the dial converter completes an energizing circuit for one or more of the relays SH1–SH10 in control apparatus S*t*4, depending on which ones of the corresponding unit number identification relays E1–E10 are at that time still operated. It will be evident that the relays SH1 to SH10 in control apparatus S*t*4 correspond in function to the relays SE1 to SE10 of control apparatus S*t*3. That is, both sets of relays identify the unit number of a particular digit, the relays SE identifying the unit number received and the relays SH identifying the unit number being retrieved from store S*p*.

A holding circuit is then established for the lowest numbered one of the relays SH by completion of an energizing circuit for its holding coil II, over the corresponding *sh* contacts, the contacts of KUH relay and relay KS. For instance, if relay E1 is still energized at this time, contacts 106*e*1 will complete an energizing circuit for relay SH1. Then, closure of contacts 120*sh*1 will complete the holding circuit for holding coil SH1(II). The completion of the holding circuit for relay SH1 prevents holding circuits from being established for the other SH relays at this time, so they release upon operation of the relay KS, no matter how many of the E-series relays are operated. Thereby, the digits are retrieved from storage in unit order, no matter how many have previously been recorded in the storage area S*p*.

The relay A1 in dial converter WU1 identifies the unit digit then to be retrived and transmitted as the second digit. This relay is energized by closure of the contacts 124*sh*1, in the following circuit:

(23) A1(WU1)+, 118*ca*1, 122*ab*1, A1, G8, bus 123, 124*sh*1, —

The operation of relay A1 interrupts the holding circuit for relay E1 and that relay therefore releases. Upon receipt of the next operation pulse in control apparatus S*t*4, the relay E2 will be in operation and held over its holding coil II in similar fashion, and upon operation of the relay A2 indicating the third digit is to be transmitted by the dial converter WU1, the relay E2 will be released, etc.

At the same time that the relay A1 is operating and performing its control functions, the stored information in storage area Sp is removed. Assuming that the dial signal which is to be taken out of storage at this time is to be identified by operation of the relays NH1 and NH5 of control apparatus St4, it will be seen from the connections of the various contacts in apparatus St4 and the retrieval matrix contacts in storage area Sp, that these relays are normally shorted by various contact trains. However, if contacts 147sh1 and 129sh1 are open at this time (corresponding to operation of unit number identification relay SH1), and if contacts 128uh1 and 148uh1 are also open (corresponding to operation of relay UH1 identifying the dial converter WU1), the short circuits around the relays NH1 and NH5 are removed. Thereby, if the relay RE1 is energized at this time (indicating storage of a digit in the first storage unit of the storage area Sp), its contacts 125re1 are engaged, and operating circuits are set up for the relay RA1, as well as for relays NH1 and NH5.

Of course, each vertical line associated with a set of *re* contacts and an RA relay, together with the connected *no*, *so* and *uo* contacts, represents a digit retrieval matrix corresponding to one storage unit of the central store Sp. Operation of the SH and UH relays in control apparatus St4 will select which one of these digit retrieval matrices is activated by the opening of short circuits therefor.

It will be evident that the particular circuit shown in FIGS. 6*a* and 6*b* for operation of relays NH1 and NH5 will be repeated in similar fashion for various other combinations of dial code identification relays. The relays will be of course arranged in a two out of five code combination such that two relays will be energized each time that the control apparatus St4 is pulsed by operation of relay AN3 in dial converter WU1. Of course it will also be evident from the specific circuit disclosed that the combination of NH relays to be operated in control apparatus St4 will be determined by which ones of the NO series of relays in storage area Sp are operated at this time. Further, the short circuits for the NH relays are partially controlled by the appropriate contacts of the SO and UO relays in the storage area, respectively identifying the unit number and the dial converter.

The operation of relay RA1 then sets up a new holding circuit for the relays of the first storage area, through contacts 83ra1 and 130tr1 (middle right, FIG. 6*b*). This circuit thus prepares for the later switching open of the first storage area to free that area for storage of another digit from the same or another dial converter.

Upon operation of the relays NH1 and NH5 of the control apparatus St4, the closure of their contacts 131nh1 and 132nh5 provides operating circuits for relays CD1 and CD5 (middle right, FIG. 5*b*) of the dial converter WU1. These relays then operate and influence the converter UE in the same fashion as did the operation of the relays in the first digit. The converter UE then operates the relay I in appropriate fashion to transmit over the connecting lines VL1 a series of direct current pulses of number dependent upon the code which was stored and then represented by closure of the relays NH1 and NH5. It will further be evident that the converter relay circuits will include other CD relays such that any two NH relays may operate a corresponding pair of CD relays and transmit to the converter UE the stored code identification of the particular digit being removed from storage.

A relay AB1 is provided and operates at this point after the coded dial signal is received, but the coil itself is not shown. The contacts 122ab1, however, initiate the release of control apparatus St4 at this point. This initiation is effected by the opening of the energizing circuit for relay A1 and by operation of the contacts 112ab1 to open the energizing circuit for relay UH1, as well as for relay CA1. The relay KUH therefore releases to open the holding circuit for the relay SH1. At the same time, an energizing circuit for relay TA1 is completed over the contacts 122ab1. (This is prior to actual release of relay CA1.) A holding circuit is immediately established for relay TA1, and the relay TR1 of the central storage apparatus (top left, FIG. 6*b*) operates. This causes operation of the contacts 130tr1 (middle right, FIG. 6*b*) to open the holding circuits for the storage relays NO1 and NO5, SO1 and SO5, and UO1 and UO5. This first storage unit of the storage area is therefore released and ready to receive the next digit transmitted to it. However, a holding circuit is provided for the relay RE1 including contacts 88re1, so that the remaining relays RE2 to RE*x* (for identification of the seized or operated storage units) can remain switched on.

It will be evident that these operations are repeated time after time, until the last stored digit is transmitted by the dial converter. That is, each one of the digits stored for a particular dial converter, such as WU1, will be removed from storage and transmitted over the corresponding connecting lines, until the last stored digit is retrieved. This operation is essentially a repetition of the operation described for retrieval and transmission of the second digit, so that the sequence will not be repeated. However, when the last stored digit has been retrieved and transmitted, the relay TT will be operated over the contacts 92zw, 93ea, 94e1 and 95e10. With operation of the relay TT, the holding circuit including contact 137tt will be interrupted and the control apparatus St1 is released, as well as the operated portion of the control apparatus St2.

It will be further apparent that the retrieval operation is completely independent from the storage operation itself. That is, the digits are stored as they are received in separate storage units of the storage area Sp by repetitive operation of the control apparatus St3 as directed by the dial receiver TE, and by operation of the next storage unit in line under the instruction of the control apparatus St3. This will continue until all of the transmitted digits have been stored, but in the meantime the stored digits may be removed from the storage units completely independently of the storage operation itself. In other words, it is not necessary for the retrieval operation to follow the storage operation, such as by the second digit being retrieved immediately after storage thereof and before storage of the third digit. In fact, all digits might well be stored prior to the retrieval of any digit, or several might be stored while a single digit is being retrieved and transmitted. This will be dependent upon the speed of reception of the coded dial signal, as compared with the speed of transmission of the decimal signal from the dial converter.

It will be evident that many minor changes could be made in the apparatus specifically shown and described in this application. More particularly, known electronic means could be used instead of the various relays particularly described. Indeed, the usual lattice circuits or flip-flop circuits could readily be used in place of the relays shown. As a result, the invention is not to be considered limited to the particular apparatus shown and described hereinabove, but rather only by the scope of the appended claims.

I claim:

1. A connection system for telephone apparatus operable to transmit decimal dialing pulses representing dialing digits over a connecting line upon receipt from a speaking station either of decimal dialing pulses or code dialing pulses (which are more rapidly received than decimal dialing pulses) representing said decimal dialing pulses, which comprises, a plurality of converters each operable to cause transmission of decimal dialing pulses over the connecting line upon receipt of a representation of a received code dialing digit and operable to have a free one of their number seized upon reception by the connection system of dialing pulses from a speaking station, a plurality of receivers each operable to translate received code dialing pulses into representations thereof and operable to have a free one of their number seized upon reception by the connection system of code dialing pulses to receive such pulses for translation thereof, first control apparatus operable to be connected to the receivers upon reception of pulses thereby, said control apparatus including first storage means for temporarily storing the representation of the received pulses translated by the receiver, second and third storage means connected to the seized converter and respectively operable to temporarily store an identification of that converter and an identification of the unit number of the thus stored digit in a train of dialing digits;

a central storage apparatus including a plurality of storage units each operable to store a representation of a received digit, the unit number of that digit and the converter seized upon reception thereof, said first control apparatus being operable to transfer the said temporarily-stored representation and identifications to a free unit of said central storage apparatus whereupon the temporary storage means are released, and second control apparatus connected to a seized converter upon completion of transmission therefrom and operable under control of the identification of the connected converter and the identification of the digit following the one just transmitted therefrom to connect to the storage unit in which the next unit digit is stored and supply its representation to that converter for transmission.

2. The apparatus of claim 1 including means in said first control apparatus operable in response to the first received coded digit unit to connect said first storage means directly to the seized converter to cause direct transmission of the decimal equivalent thereof without storage in the central storage apparatus.

3. The apparatus of claim 1 including first switching mean in each converter operable to identify the unit number of each digit received by the receiver during the period of seizure of the converter, and second switching means in each converter operable upon completion of transmission of a decimal digit unit caused by that converter, and in dependence upon the operation of said first switching means, to control said second control apparatus to connect the representation of the next digit unit to the seized converted.

4. The apparatus of claim 3 in which said second control apparatus includes first switching means connected to said second switching means of the seized converter operable to identify the seized converter, and second switching means connected to said first switching means of the converter operable to indicate the next digit unit to be transmitted, said first and second switching means of the second control apparatus being operable to cause retrieval of the proper digit from the proper storage unit.

5. The apparatus of claim 4 in which each storage unit of the central storage apparatus has switch contacts operated in correspondence to the digit representation, the converter identification and the digit unit stored therein, said contacts being arranged in a retrieval matrix, third switching means in said second control apparatus connected to each retrieval matrix, the matrices beoperable to form energizing circuits for said third switching means, but said first and second switching means normally preventing operation of said third switching means but, upon operation to identify the converter and digit unit, being operable to disable the prevention function as to the matrix in which that converter and digit unit identification are stored.

6. The apparatus of claim 4 including third switching means in each said converter operable upon operation of said second switching means of said second control apparatus to control the first switching means of the seized converter to release the identification of the digit unit just registered by said second switching means of said second control apparatus.

7. The apparatus of claim 4 in which each storage unit of the central storage apparatus has switch contacts corresponding to the digit representation, the converter identification and the digit unit identification stored therein, said contacts being arranged in a retrieval matrix, third switching means in said second control apparatus connected to each retrieval matrix, the matrices being operable to form energizing circuits for said third switching means, but said first and second switching means normally shorting said third switching means but upon operation to identify the converter and digit unit being operable to remove the corresponding shorts for the matrix in which that converter and digit unit identification are stored so that such matrix may cause said third switching means to identify the digit unit stored in the matrix, and first switching means in each said matrix operable upon energization of said third switching means of said second control apparatus to release the switches of that matrix so that a subsequently-received digit may be stored in that storage unit.

8. The apparatus of claim 7 in which each storage unit of said central storage area further includes an operating matrix formed of operating coils for the switches thereof representing the seized converter unit, the digit unit number and the received digit itself, a holding matrix formed of holding coils for the said switches thereof, and forward switching means energized upon each operation of a holding matrix to release the corresponding operating matrix and prepare the next free operating matrix for storage of a digit unit.

9. The apparatus of claim 1 including means in each converter for permitting seizure of that converter by a connecting line only during transmission of a decimal pulse caused by the converter and for a short time thereafter, so that the converter is released upon transmission of the last digit.

10. The apparatus of claim 2 in which each speaking station provided with means for code dialing is also operable to transmit a pre-dialing signal before each train of code dialing digit units, said connection system including means responsive to said pre-dialing signal for seizing a free receiver during reception by the connection system of the code pulses, said receivers each being operable to seize a free first control apparatus upon reception by a seized receiver of a code dialing digit.

11. The apparatus of claim 10 in which said connecting system further includes second means responsive to said pre-dialing signal for seizing a free one of said converters to connect the seized converter to the seized receiver, said converter having switching means connected to the seized receiver to be pulsed thereby upon each reception of a coded dial digit to store the unit number of the latest digit received by the receiver, said third storage means of the first control apparatus being connected to said switching means of the converter to be advanced thereby as each digit unit is received.

12. The apparatus of claim 11 including second switching means in each converter operable upon completion of transmission thereby of a decimal unit representing a coded dial unit to control said first-mentioned switching means of the converter to cause registry thereby only of higher-numbered digit units.

13. The apparatus of claim 2 in which said seized first control apparatus further includes means operable in response to each received digit subsequent to the first to connect said first storage means to said central storage apparatus for storage of such subsequent digits.

14. The apparatus of claim 1 in which each speaking station equipped with means for code dialing is also operable to transmit a pre-dialing signal before each train of code dialing digit units, said connection system further including a plurality of transmission devices each operable to furnish a repeater for connection between a calling station line and a connection line upon reception thereby of a pre-dialing signal, means responsive to seizure of a transmission device to seize a free receiver to connect that receiver to the transmission device for reception of dialing pulses from that device, and means for releasing the connection of the seized receiver to the seized transmission device upon storage of the digit in said first control apparatus.

15. A connection system for telephone apparatus operable to transmit decimal dialing pulses over a connecting line upon receipt from a speaking station either of decimal dialing pulses or code dialing pulses (which are more rapidly received than decimal dialing pulses can be transmitted) representing said decimal dialing pulses, which comprises, a plurality of converter units each operable when supplied with the representation of a received digit to translate that digit into corresponding decimal dialing pulses, a plurality of transmission devices connectable to a converter unit upon reception of dialing pulses from a station and each operable when supplied with decimal dialing pulses by a converter to transmit such pulses over the connecting line, said transmission devices each being operable when seized by a calling station to receive dialing pulses therefrom, a central storage apparatus composed of a number of storage units each operable to store a representation of a received digit, an identification of the unit number of that digit in a train of digits forming a complete set of dialing pulses, and an identification of a particular converter unit connected with the transmission device from which the recorded representation of a received digit was received at the time it was received, first control apparatus connected to each one of said transmission devices and operable to transmit to a free one of said storage units a representation of each code dialing digit received from a transmission device when seized by that transmission device, together with a representation of the converter connected to that transmission device, and a representation of the unit number of the code dialing digit, and second control apparatus connectable to said converter units upon completion of translation of a representation of a stored digit into decimal dialing pulses, said second control apparatus being operable thereupon to supply to such converter unit from the central storage unit within which the next unit identified with that converter is stored, the representation of the digit stored in that unit.

16. A connection system for telephone apparatus operable to transmit decimal dialing pulses upon receipt either of decimal dialing pulses or code dialing pulses (which are more rapidly received than decimal dialing pulses can be transmitted) representing said decimal dialing pulses, which comprises, means for transmitting decimal dialing pulses upon receipt of code dialing signals, a central storage apparatus for storing received code dialing pulses, control apparatus operable alternatively to transfer the code dialing pulses to said transmission means and to said central storage apparatus, said control apparatus including means for identifying the unit number of each received digit, said identification means being operable to influence the control apparatus to supply the first one of a train of code dialing signals to the transmitting means but subsequent signals to the central storage apparatus, and means responsive to completion of transmission of each dialing signal digit from the transmitting means to supply the transmitting means with the code signal corresponding to the next dialing signal digit from the central storage apparatus.

References Cited

UNITED STATES PATENTS

| | | | |
|---|---|---|---|
| 2,933,563 | 4/1960 | Hohmann ___________ | 179—18 |
| 3,127,479 | 3/1964 | Macurdy et al. _______ | 179—18 |
| 3,133,155 | 5/1964 | Kuchas _____________ | 179—18 |

KATHLEEN H. CLAFFY, *Primary Examiner.*

L. A. WRIGHT, *Assistant Examiner.*